July 11, 1967  C. C. JOHNSON  3,330,510
ORBITAL ESCAPE DEVICE
Filed Jan. 19, 1967  4 Sheets-Sheet 1
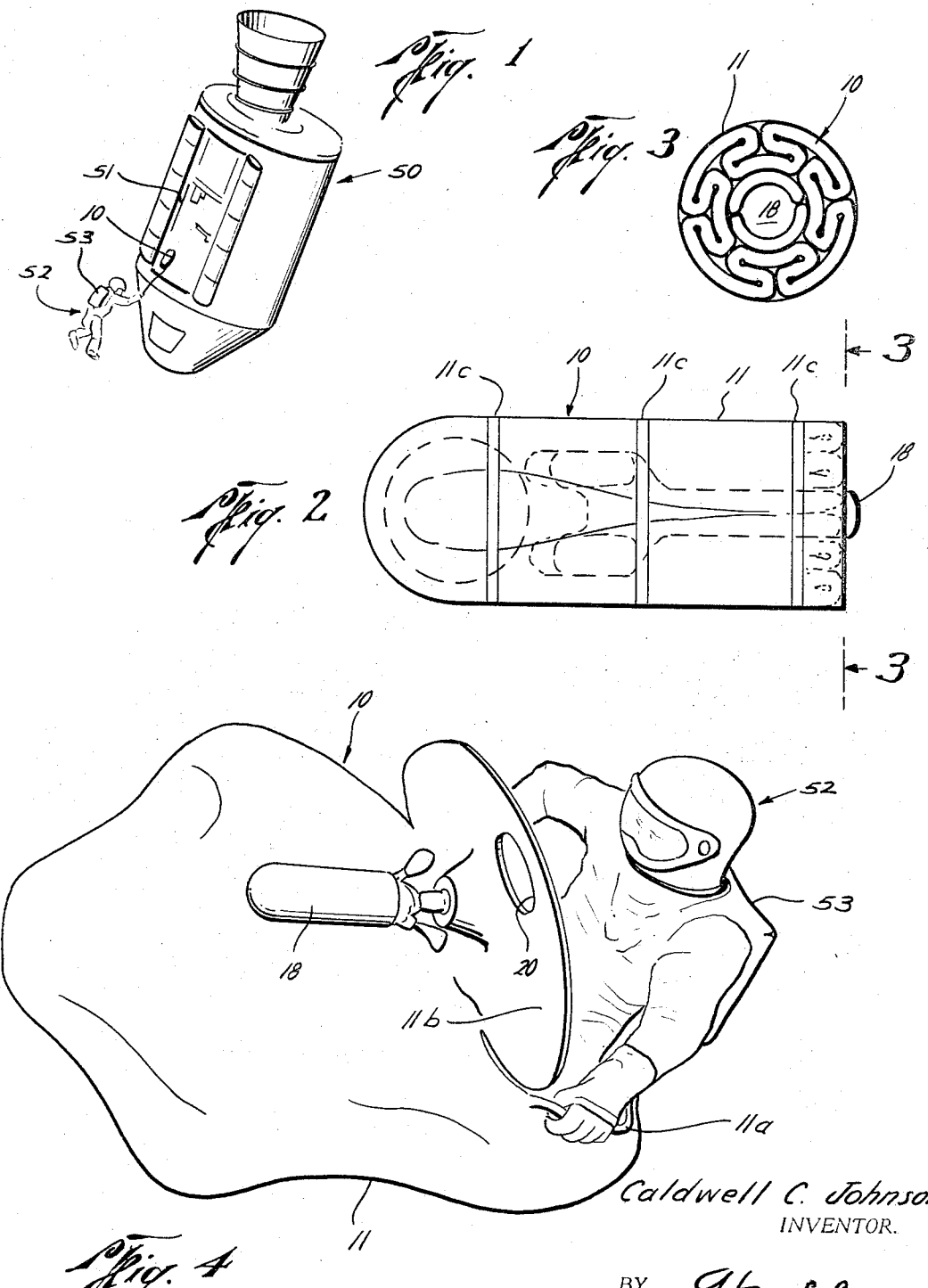
Caldwell C. Johnson
INVENTOR.
BY
ATTORNEY

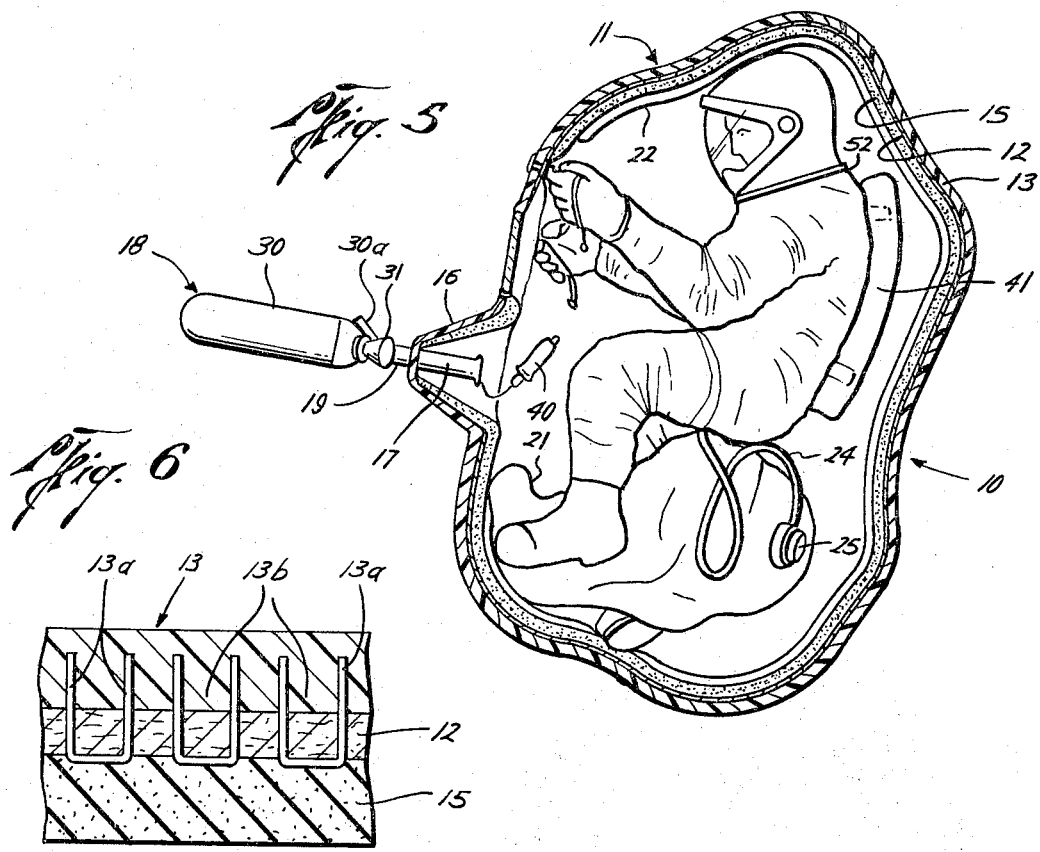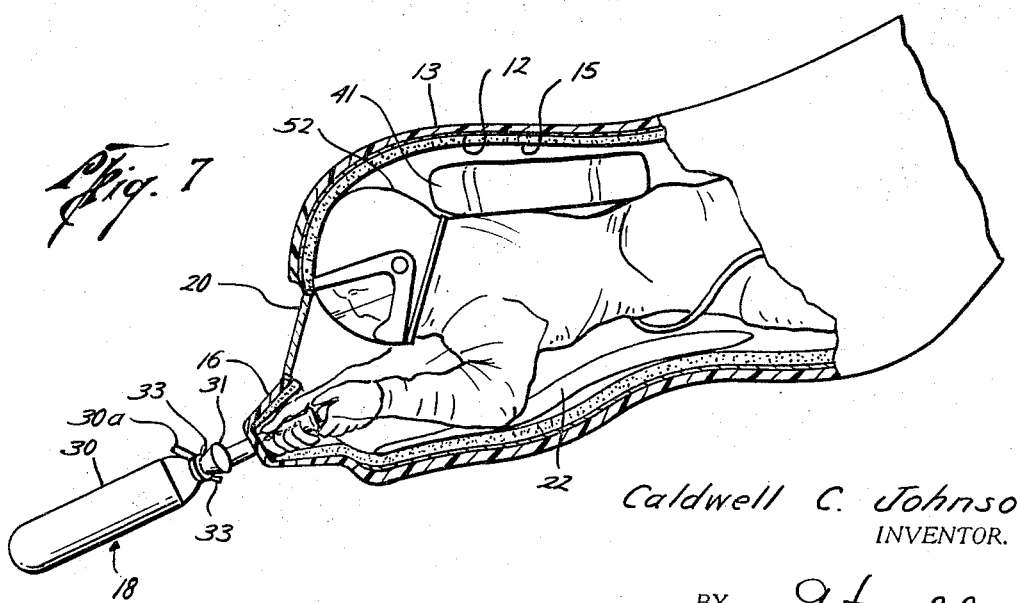

July 11, 1967 C. C. JOHNSON 3,330,510
ORBITAL ESCAPE DEVICE
Filed Jan. 19, 1967 4 Sheets-Sheet 3

Caldwell C. Johnson
INVENTOR.

BY
ATTORNEY

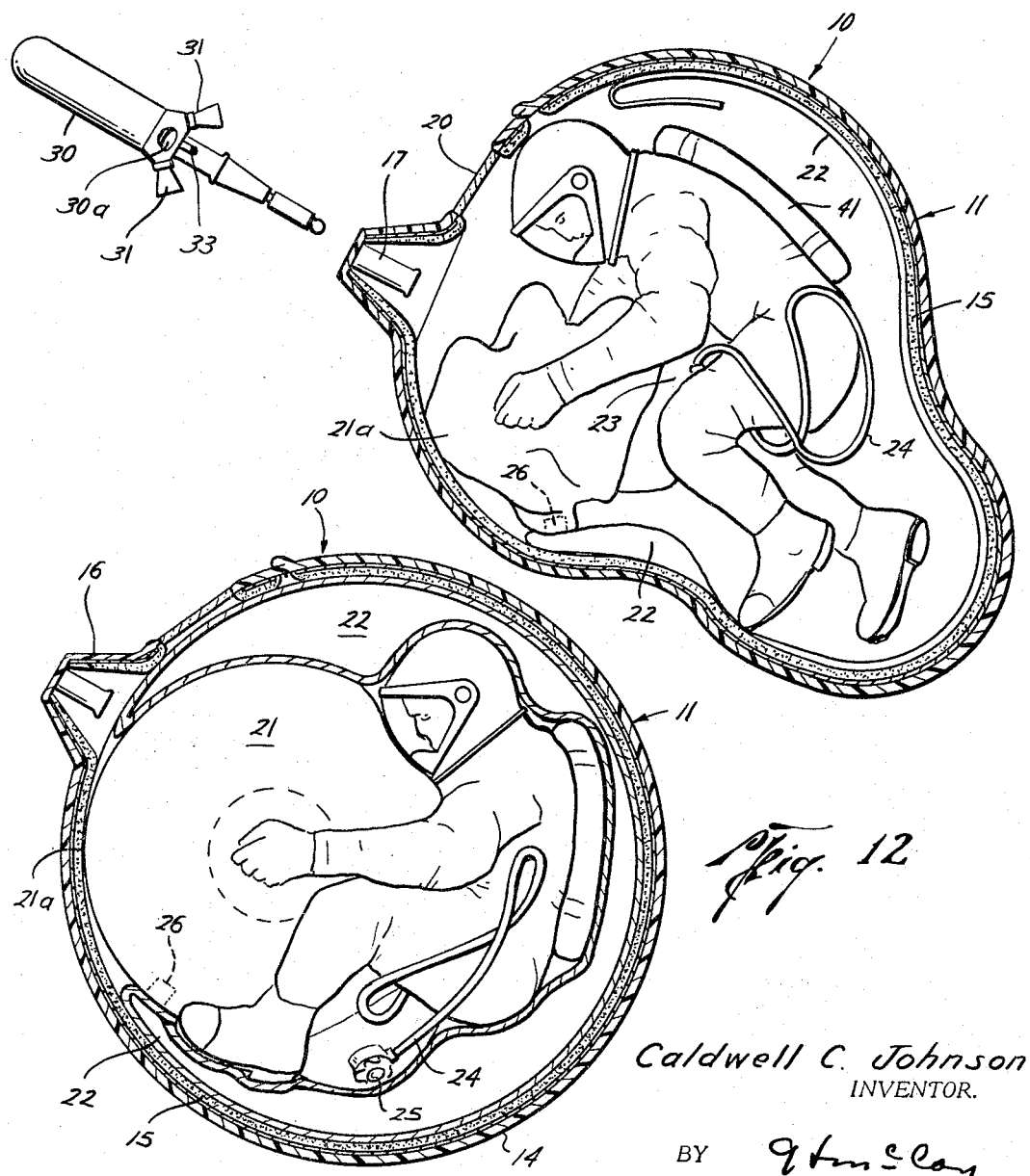

3,330,510
ORBITAL ESCAPE DEVICE
Caldwell C. Johnson, 3828 Bayou Circle,
Dickinson, Tex. 77539
Filed Jan. 19, 1967, Ser. No. 610,724
8 Claims. (Cl. 244—138)

ABSTRACT OF THE DISCLOSURE

An orbital escape vehicle which can be folded and stowed aboard an earth orbiting, manned spacecraft and used to safely return a crewman to the earth's atmosphere in the event of an emergency. The vehicle is comprised of a flexible casing having an ingress-egress opening therein, a heat ablative means covering said casing, and an inflatable bladder system within said casing for supporting the crewman and for maintaining said casing in a stable aerodynamic shape during its reentry into the atmosphere.

---

The invention described herein was made by an employee of the United States Government and may be manufactured and used or for the Government for governmental purposes without the payment of any royalties thereon or therefor.

This invention relates to an orbital escape vehicle, and more particularly relates to an inflatable reentry vehicle which can be stowed aboard an orbiting manned spacecraft and used to return a crewman to earth in the event that the manned spacecraft becomes disabled.

Man's ability to leave the earth's atmosphere, orbit the earth, and return safely is now a reality. However, vehicles required for carrying out such missions are extremely complex, and it is conceivable that failure could occur within a vehicle while it is in orbit which would prevent said vehicle from successfully reentering the earth's atmosphere. In such an event, the vehicle and its crew would be doomed to either orbit the earth forever, or to reenter the atmosphere in an uncontrolled manner which obviously would be disastrous. Therefore, the need for an emergency escape means for crewmen of an orbiting space craft is readily apparent.

Various means for rescuing stranded astronauts have been proposed, but heretofore none have proven feasible. For example, it has been proposed that a second spacecraft be readied for launch in the event that an orbiting spacecraft becomes disabled in orbit. With technology as it now exists, such a rescue, in addition to the tremendous expense involved, would depend upon the orbital position of the disabled craft, and if said craft were not in proper position for a quick rendezvous, the "catch up" time required for the rescue craft to reach the disabled vehicle could be fatal. Therefore, it is vitally important that the escape means be immediately available to the stranded crewmen whereby they can effect a timely return to earth in the event of an emergency.

To adequately function as an escape vehicle, said vehicle must meet a strict set of requirements. As mentioned above, the escape vehicle must be capable of being carried on board the orbiting spacecraft so that it will be immediately available to the occupants of the craft. This requires the vehicle to be relatively light in weight and to occupy a relatively small space while stowed on the spacecraft. Also, the vehicle must include means for properly orienting said vehicle for reentry and for braking the speed of the vehicle so that it will drop from its orbital path and reenter the atmosphere in a controlled and predictable manner. Further, the vehicle must include protection from the intense heat which is generated during reentry, and must provide a proper environment for the crewman during reentry. Finally, means must be provided for lowering the crewman to a safe landing after he has reentered the atmosphere.

The present invention fully meets all of the above mentioned requirements. The orbital escape vehicle of the present invention provides the minimum equipment necessary for an individual crewman of an earth-orbiting spacecraft to effect and survive both atmospheric reentry and earth landing in the event that said spacecraft becomes disabled. Structurally, the invention comprises an inflatable casing having a basic spherical configuration when inflated. The casting is comprised of a substrate of heavy nylon cloth which has a zippered opening therein through which a crewman can ingress and egress. The outer surface of said casing is covered with a heat ablative material, while the interior of the casing is adequately lined with insulative material. A small double-panelled window is provided in the casing so the crewman can properly sight the vehicle on a reference point during retrofiring, as will be explained in detail below. A hand grip is provided in the casing through which a solid propellant, internally burning retrorocket assembly is fitted. The retrorocket assembly has air nozzles means as a part thereof which can be connected to a pressure source from within the vehicle to provide means for orienting the vehicle to a proper reentry attitude prior to retrofire.

An inflatable bladder system is provided in the casing and is comprised of an inner spherical bladder and an outer bladder which conforms to the basic inner configuration of the casing. Also provided in the casing is a gaseous oxygen supply for providing breathing and cooling oxygen for the crewman, a gaseous nitrogen supply for inflation of the bladders, and a parachute having survival equipment on the harness thereof.

The operation of the reentry vehicle is as follows. The vehicle is folded into a relatively small package and is stowed in an external compartment of an orbiting spacecraft. In the event that the spacecraft malfunctions and is unable to effect a safe reentry, a crewman dons proper extravehicluler garments which are part of his standard equipment, and connects his suit to either a backpack supply of necessary oxygen, or to the spacecraft's ogygen supply system by use of a long, umbilical line. He then leaves the cabin of the spacecraft, works his way to the storage compartment, and removes the packaged vehicle. The straps holding the vehicle in a folded position are then removed and the vehicle is unfolded. After the crewman has partially entered the vehicle, he switches his oxygen supply from the backpack or spacecraft to the oxygen supply in the vehicle. He then discards the backpack or umbilical line, puts on a parachute and related survival equipment which are stowed in the vehicle, completely enters the vehicle, and zips up the ingress opening in the vehicle.

The crewman next positions himself with respect to the vehicle so that he can hold the hand grip with one hand and arm the retrorocket assembly with the other. When he is in this position he is also in position to see through the window in the casing. During this time used oxygen and $CO_2$ from crewman's suit are being exhausted through the air nozzles on the retrorocket assembly, and by manipulating the hand grip and rocket assembly the crewman can maneuver the air nozzles to properly orient the spacecraft to the right attitude for retrofire. The crewman then waits until he sights a predetermined reference point on the earth, at which time he fires the retrorocket. Upon completion of the retro firing the retrorocket assembly is jettisoned and the bladders are inflated in said vehicle. These bladders position and support the crewman with respect to the casing so that the vehicle and creman form a definite aerodynamic shape which has a high degree of stability during reentry.

In a short time the vehicle will fall into the earth's atmosphere, and during the early moments of reentry a tremendous amount of heat is generated. This heat will be dissipated by the heat ablative structure on the vehicle, and the insulation in the casing will maintain the interior of the vehicle at an acceptable level for survival of the crewman. After the vehicle has passed through the heating zone it will continue to fall, and the air at the lower regions of the atmosphere will cool same. Since the bladders of the vehicle are at a very small absolute pressure, the pressure of the atmosphere will cause the bladders to automatically deflate as it falls through the atmosphere, thereby notifying the crewman that he is at a safe level to leave the vehicle. The crewman then unzips the opening, disconnects the escape vehicle's oxygen supply and switches to oxygen from a standard "jump" bottle which is attached to the parachute harness, leaves the vehicle, and makes a regular parachute landing back to earth. Survival equipment in the form of a floatation vest, radio beacon, concentrated food, small amount of water, etc. are all attached either to the parachute harness or crewman space suit for use by the crewman once he has landed.

The actual construction, operation, and the advantages of the invention will be better understood by reference to the drawings in which like numerals identify like parts in the different figures, and in which:

FIG. 1 is a perspective view of a crewman retrieving the present invention from a disabled spacecraft;

FIG. 2 is a perspective longitudinal view of the orbital escape vehicle of the present invention when in a folded position;

FIG. 3 is a perspective view taken along line 3—3 of FIG. 2;

FIG. 4 is a perspective view of the present invention with a crewman entering same;

FIG. 5 is a side view partially in cross section of a crewman closing the zippered opening of the present invention;

FIG. 6 is a partial enlarged cross-sectional view of the heat protection structure of the present invention;

FIG. 7 is a side view partially in cross section of a crewman maneuvering the vehicle into a proper reentry attitude;

FIG. 11 is an exploded view partially in cross section of a crewman jettisoning the retrorocket assembly and inflating the vehicle; and FIG. 12 is a perspective view partially in cross section of the vehicle in a fully inflated position.

Figure 8:
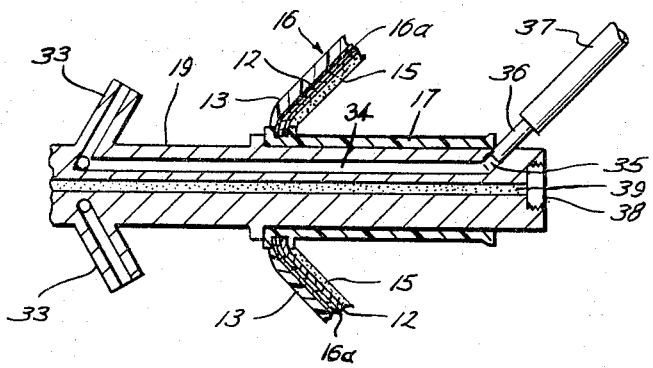
FIG. 8 is a partial longitudinal cross sectional view of the retrorocket used with the present invention.
Figure 9:
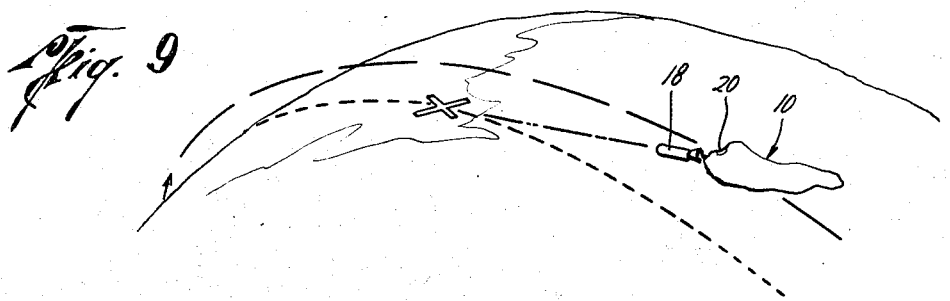
FIG. 9 is a perspective view of the retrorocket assembly of the vehicle being sighted on a reference point on the earth.

Referring more particularly to the drawings, the orbital escape vehicle 10 (see FIG. 5) comprises a casing 11 which has a spherical configuration when it is fully inflated. A zippered opening 11a (see FIG. 4) having a flap 11b is provided in casing 11 to allow ingress and egress of a crewman. Casing 11 is comprised of a substrate 12 of fiber glass or heavy nylon cloth which has a heat ablative structure or heat shield 13 secured to its exterior. Any known heat ablative material which allows the desired flexibility can be used for the heat shield. One example of a preferred construction of a heat shield is shown in detail in FIG. 6. Nylon cord 13a, or the like, is woven through substrate 12 much in the same manner as commercial "pile" carpets are woven. This "pile" carpet is then completely impregnated with a layer of an elastomer ablator to form the heat shield. The interwoven cord 13a serves as reinforcement for the ablator 13b and provides a greater surface area to which the ablator material can adhere. The ablator or heat shield 13 at the stagnation point 14 (see FIG. 12), or that point which will receive the greatest load during reentry, is approximately 0.50 inch thick and tapers to approximately 0.010 inch thick 180° from the stagnation point. A layer of insulative material 15, e.g. a 0.5 inch layer of polyurethane foam, is bonded or otherwise secured to the interior of casing 11 to provide the necessary insulation for reentry. This over-all small thickness of the heat shield 13, substrate 12, and insulative layer 15 allows the entire casing 11 and its related equipment (which will be discussed below) to be folded into a compact package having a length of approximately 4 feet and a constructive diameter of 1.5 feet (volume of 7 cubic feet), see FIGS. 2 and 3 for folded configuration.

A conical projection 16 is formed on flap 11b and is at a point approximately 180° from stagnation point 14. Projection 16 can be formed by embedding a stiff wire 16a, or the like, in the selected portion of substrate 12 (see FIG. 8) to give projection 16 its necessary configuration. This projection 16 has an opening therethrough to which a hand grip 17 is attached. The grip 17 can be rotated relative to projection 16 and, due to the flexibility of the casing surrounding projection 16, hand grip 17 can also be "wobbled" with respect to the casing. Grip 17 is a hollow and is adapted to receive the shank 19 of a retrorocket assembly 18 which will be discussed further in detail below. Rocket assembly 18 is press-fitted in grip 17, or is secured thereto by easily releasable shear pins or spring detents (neither shown) whereby the assembly can be easily moved by grip 17, but can also be easily separated therefrom when desired. A double-panelled, heat-resistive window 20 (approximately six inches in diameter) is secured in flap 11b adjacent conical projection 16 for a purpose discussed later.

A bladder system is provided in casing 11 for shaping and stabilizing vehicle 10 during reentry. This system consists of an inner inelastic, pressure tight, fabric bladder 21 and an outer semi-elastic bladder 22 (see FIG. 11). The inner bladder 21, which assumes a spherical configuration approximately 36 inches in diameter when inflated, is connected only at one point 21a (approximately 150° from the stagnation point and opposite the window) to insulation layer 15 by means of bonding or the like. Outer bladder 22 is connected to insulation layer 15 along the greater portion of its length. Bladder 22 is so constructed that it will essentially conform to the inner configuration of the casing 12 along its outer parameter and to the configuration of the crewman along its inner parameter to essentially form a "cocoon" about the crewman when bladder 22 is in its fully inflated position.

An oxygen bottle 23 is partially embedded in the inner sphere and is hermetically sealed thereto. Oxygen bottle 23 has a hose outlet 24 which is controlled by valve 25, and which is adapted to be connected to the suit of the crewman to provide oxygen for both cooling and breathing, and for pressurizing the space suit. Bladders 21 and 22 are connected to each other by a pressure reducing valve 26 for a purpose disclosed later. Also completely embedded and sealed in inner bladder 21 is a nitrogen gas bottle (not shown) which is attached to the inner side of one of two diametrically opposed handles (not shown) provided on the bladder 21. These handles can consist of a molded rubber projection, straps, or any other means whereby the crewman can grasp opposite sides of said inner bladder to open said nitrogen bottle and to maneuver bladder 21 to its proper position while it is being inflated.

Figure 10:
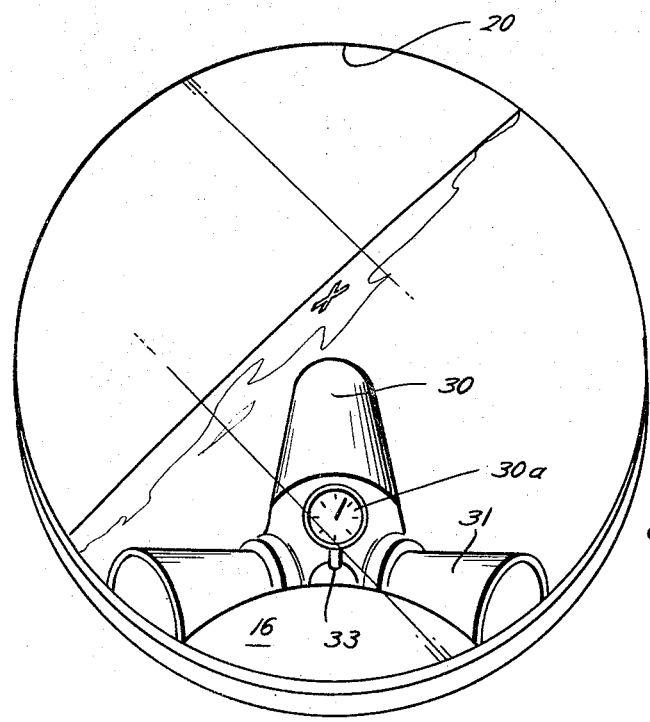
FIG. 10 is a perspective view looking out the window of the orbital escape vehicle at the time of retrofire.

The retrorocket assembly 18 preferably consists of a solid propellant, internally burning rocket engine 30 capable of developing 7500 pound-seconds of impulse at an average thrust of 200 pounds. Rocket engine 30 has dual canted thrust nozzles 31 positioned to brake the orbital speed of vehicle 10 and to direct the blast of said rocket away from the vehicle when the rocket is fired. The rocket normally includes a spring wound timing device 30a (see FIG. 10) that starts upon rocket ignition and "times" the length of retrorocket firing, as will be discussed in greater detail below. Assembly 18 has a shank portion 19 which is adapted to extend through the opening of grip 17, as briefly explained above, and has canted nozzles 33 as an integral part thereof. A longitudinal passage 34 extends the length of shank 19 and connects opening 35 with air nozzles 33. Opening 35 is adapted to receive a press type fitting 36 which is connected to a hose 37 which in turn is adapted to be connected to the vent of a crewman space suit for a purpose disclosed below. The fitting 36 is easily disengageable from opening 35.

Shank 19 has a threaded opening 38 at the lower end thereof which normally has a safety cap (not shown) screwed therein to prevent premature firing of the retrorocket. This safety cap is removed by a crewman after he has entered vehicle 10, and a percussion igniter 40 which is stowed in the vehicle is screwed into opening 38 to arm the rocket 30. A primary igniter material 39 is provided in shank 19 which is ignited by igniter 40 to actuate and fire rocket engine 30. Electric leads (not shown) could also be provided in shank 19 to allow igniter 40 to start timing device 30a, or timer 30a could be actuated by a pressure switch which would be responsive to the pressure within rocket 30 when fired. It is recognized that a parachute including a standard oxygen "jump" bottle for landing the crewman and survival equipment such as a $CO_2$ inflatable floatation vest, survival kit, emergency rations, and a radio beacon all can be stowed in vehicle 10.

The operation of the orbital escape vehicle is as follows. The vehicle 10 is folded and stowed in an external compartment 51 of a manned orbiting spacecraft 50. In the event spacecraft 50 becomes disabled, a crewman 52 immediately updates his knowledge of his ephemeris, desirable retrofire landmarks, firing duration, etc. He does this from both on-board information and/or ground supplied data. During this time it is desirable that crewman 52 will take on as much food and water as possible from the spacecraft systems before leaving spacecraft 50. These operations will take approximately 3 to 5 minutes. Crewman 52, after donning proper extravehicular activity garments, will then leaves spacecraft 50 and retrieve vehicle 10 from the service module (see FIG. 1). During this mode of operation, crewman 52 is being supplied with oxygen either from a backpack 53 or through an umbilical cord (not shown) connected to the spacecraft's oxygen supply. Upon retrieving the escape vehicle, he releases straps 11c (see FIG. 2), and places his feet through unzipped opening 11a into vehicle 10 (see FIG. 4). At this stage he reaches into casing 11 for hose 24, attaches it to his space suit and opens valve 25. There should be approximately a two hour supply in oxygen bottle 23. Once the hose 24 is attached and valve 25 is open, he discards his backpack 53 or umbilical cord, completely enters the vehicle 10, and zips up the zipper opening 11a (see FIG. 5). This total operation should take approximately 12 minutes. He next "wiggles" himself into the position shown in FIG. 7 so that his body is essentially straight and where he can grip 17 with one hand. He then unscrews the safety device (not shown) from shank 19 of retrorocket assembly 18 and attached precussion igniter 40 to the rocket. Igniter 40 also has a hand grip thereon which the crewman can grasp with his other hand to help hold the rocket in grip 17 while it is being fired and to aid in maneuvering rocket assembly 18 with respect to casing 11.

Crewman next attaches vent hose 37 on his suit to opening 35 in the shank of the retrorocket so that oxygen and $CO_2$ venting from his suit will pass through passage 34 in shank 18 to air nozzles 33. By twisting and wiggling grip 17 and the handle on igniter 40, the crewman can utilize the thrust from nozzles 33 to maneuver vehicle 10 into a proper reentry attitude. This attitude is achieved when retrorocket assembly 18 is pointing at or just slightly below the earth's horizon as it appears downrange along the orbital path (see FIG. 10). Crewman 52 during this time is looking through window 20, and when he passes over predetermined reference point X on the earth (e.g. a particular mountain range, body of water, etc.) he pulls a lanyard (not shown) on igniter 40 to fire retrorocket 30 and to start timer 30a. Maximum retrofire time for full 500 feet/sec. retrograde velocity increment at 0.5 $g$ is approximately 37.5 seconds. The crewman maintains proper attitude during retrofire by manipulating rocket assembly 18 the same as he did for attitude acquisition. Most of the retrorocket thrust will be reacted through grip 17 to casing 11. Crewman acceleration reaction will be shared between his arms and his legs. He can "stand" against the far end of casing 11 and react a large part of his acceleration force with his legs. The crewman watches timer 30a (see FIG. 10) and when the proper retrotime has elapsed he releases the handle of igniter 40 which allows the still firing rocket assembly 10 to pull itself out of grip 17 and jettison itself from vehicle 10. Fitting 36 on hose 37 will easily disengage as the shank 19 is pulled through grip 17.

Since there will be at least a minimum of eight minutes between the completion of retrofire and reentry of the earth's atmosphere, crewman has ample time to locate and grasp the two handles (not shown) diametrically opposed on inner bladder 21. Since bladder 21 is highly flexible, the nitrogen bottle embedded therein can easily be opened or broken to allow the inner bladder to inflate. Inner bladder 21 will inflate to 5 p.s.i.a. in about one minute, during which time the crewman maintains a grip on the handles and positions himself on bladder 21 by wrapping his legs around oxygen bottle 23 (see FIG. 11). When inner bladder 21 reaches 1.75 p.s.i.a. pressure, pressure reduction valve 26 (see FIGS. 11 and 12) will begin to meter nitrogen into outer bladder 22 which will fully inflate to 1.75 p.s.i.a. in about 2 minutes. During this time, pressure within bladder 21 will drop to 3.0 p.s.i.a. Crewman 52 will now be semi-enveloped in outer bladder 22 and somewhat pressed into the higher pressurized inner bladder 21. The 1.75 p.s.i.a. bladder pressure is selected as the minimum required to maintain the now spherical contour of casing 11 during reentry and to properly support crewman up to 8.5 $g$ acceleration. The pressures in the bladders are limited to a value that will not collapse crewman's pressure suit and thereby insures that proper oxygen circulation and cooling will be maintained during reentry. The vehicle and crewman are now in the configuration shown in FIG. 12.

During early moments of reentry vehicle 10 will pass through a zone in which intense heat is generated, but this heat is adequately dissipated by heat shield 13 with insulation 15 maintaining the interior of casing 11 at an acceptable temperature. Once the vehicle is through this zone, it will fall through the atmosphere which will tend both to slow and cool the vehicle. At approximately 50,000 feet altitude, the pressure differential across the bladders will noticeably decrease. At 30,000 feet, outer bladder 22 will relax to the point where vehicle 10 is no longer spherical. Crewman 52 can now move his arms freely and can begin unzipping flap 11b. At 15,000 feet, outer bladder 22 is almost completely deflated, and inner bladder 21 is but 30% to 40% of its original volume. Vehicle 10, which now has no shape of its own, is descending at approximately 200 feet/sec. Crewman 52 switches from oxygen bottle 23 to the "jump" bottle (not shown) on his parachute harness, pulls himself out of casing 11, and makes a regular parachute landing back to earth. He can then utilize his survival equipment until he is picked up by rescue craft.

While the invention has been described with reference to a particular detailed embodiment, it should be understood that modifications, substitutions, and the like may be made without departing from the spirit of the invention and the scope of the appended claims.

What is claimed and desired to be secured by Letters Patent is:

1. An emergency reentry vehicle for returning a crewman of an orbiting spacecraft into the earth's atmosphere comprising:
   a flexible casing which can be folded into a relatively small volume for storage, said casing having a closeable opening therein to allow ingress and egress of said crewman;
   heat ablative means on said casing for protecting said crewman from the intense heat present during reentry into the atmosphere;
   inflatable means in said casing both for positioning and supporting said crewman within said casing, and for forming said casing into a stable aerodynamic shape prior to reentry, said inflatable means being deflatable after reentry;
   means controllable by said crewman for orienting said vehicle to a proper attitude for reentry;
   a retrorocket assembly means attached to said casing and controllable by said crewman from within the casing for braking the orbital speed of said vehicle; and
   oxygen supply means in said casing for supplying said crewman with necessary oxygen for breathing and cooling during reentry.

2. An emergency reentry vehicle as set forth in claim 1 wherein said stable aerodynamic shape of the vehicle is substantially spherical.

3. An emergency reentry vehicle as set forth in claim 2 wherein said inflatable means comprises:
   an inner inflatable bladder means attached to the interior of said casing, said inner bladder being of spherical configuration when inflated, and so positioned that said crewman can lie on said inner bladder and wrap his arms and legs around same;
   an outer inflatable bladder means attached to the interior of said casing, said outer bladder means having an outer surface which assumes a basic spheric configuration when inflated to give said casing a spherical configuration, and having an inner surface which substantially surrounds said crewman and said inner bladder means;
   means sealed in said bladder means for supplying fluid under pressure to inflate said inner bladder means; and
   valve means connecting said inner and outer bladder means wherein said fluid supplied to said inner bladder means can pass into and inflate said outer bladder means.

4. An emergency reentry vehicle for returing a crewman of an orbiting spacecraft into the earth's atmosphere comprising:
   a flexible casing which can be folded into a relatively small volume for storage, said casing having a closeable opening therein to allow ingress and egress of said crewman;
   heat ablative means on said casing for protecting said crewman from the intense heat present during reentry into the atmosphere;
   said casing having a formed projection at one point on its surface;
   a grip rotatably mounted to the interior of said projection and extending into the interior of said casing whereby it can be gripped by said crewman;
   a retrorocket assembly means attached to said grip whereby manipulation of said grip will manipulate said retrorocket means, said retrorocket positioned to brake the orbital speed of the vehicle when fired, said retrorocket assembly means including:
      means, controllable by said crewman, for orienting said vehicle to a proper attitude for reentry;
   inflatable means in said casing for positioning and supporting said crewman within said casing, and for forming said casing into a stable aerodynamic shape prior to reentry; and
   oxygen supply means in said casing for supplying said crewman with necessary oxygen for breathing and cooling during reentry, 5. An emergency reentry vehicle as set forth in claim 4 wherein said stable aerodynamic shape of the vehicle is substantially spherical.

6. An emergency reentry vehicle as set forth in claim 5 wherein said inflatable means comprises:
   an inflatable inner bladder means attached to the interior of said casing, said inner bladder being of spherical configuration when inflated, and so positioned that said crewman can lie on said inner bladder and wrap his arms and legs around same;
   an inflatable outer bladder means attached to the interior of said casing, said outer bladder means having an outer surface which assumes a basic spheric configuration when inflated to give said casing a spherical configuration, and having an inner surface which substantially surrounds said crewman and said inner bladder means;
   means sealed in said bladder means for supplying fluid under pressure to inflate said inner bladder means; and
   valve means connecting said inner and outer bladder means wherein said fluid supplied to said inner bladder means can pass into and inflate said outer bladder means.

7. An emergency reentry vehicle as set forth in claim 6 wherein said grip has an axially extending bore therethrough and wherein said retrorocket assembly means includes:
   a rocket engine having canted nozzle means thereon for directing the thrust of said engine in a desired direction;
   an elongated shaft attached to said engine and extending through said bore in said grip; and
   means on said shaft for actuating said engine.

8. An emergency reentry vehicle as set forth in claim 7 wherein said means for orienting said vehicle are positioned on said shaft.

References Cited

UNITED STATES PATENTS 3,286,951  11/1966  Kendall _____ 244—1

FERGUS S. MIDDLETON, *Primary Examiner.*